(No Model.)
N. R. STREETER & C. P. MOSHER.
COMBINED NUT CRACKER AND PICKER.
No. 508,355. Patented Nov. 7, 1893.
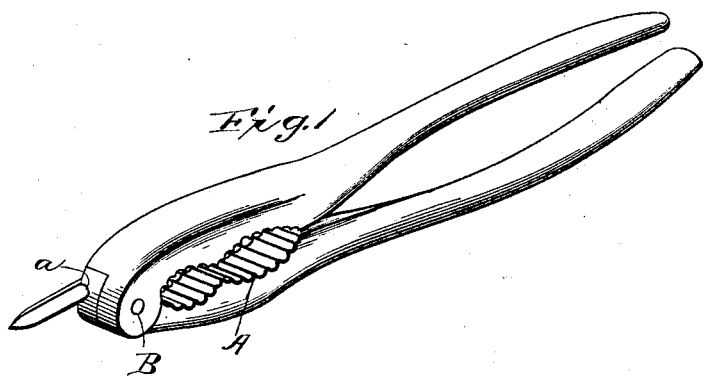

UNITED STATES PATENT OFFICE.

NELSON R. STREETER AND CHARLES P. MOSHER, OF GROTON, NEW YORK.

COMBINED NUT CRACKER AND PICKER.

SPECIFICATION forming part of Letters Patent No. 508,355, dated November 7, 1893.

Application filed February 25, 1893. Serial No. 463,728. (No model.)

*To all whom it may concern:*

Be it known that we, NELSON R. STREETER and CHARLES P. MOSHER, of Groton, in the county of Tompkins and State of New York, have invented certain new and useful Improvements in a Combined Nut Cracker and Picker; and we do hereby declare the following to be a full, clear, and exact description of the invention, such as will enable others skilled in the art to which it pertains to make and use it, reference being had to the accompanying drawings, which form a part of this specification.

Our invention relates to an improvement in combined nut crackers and pickers and it consists in providing the cracker with a projecting picking prong, as will be fully described hereinafter and particularly referred to in the claims.

The object of our invention is to provide an improved combination tool which will both crack and pick nuts.

Referring to the accompanying drawings:—Figure 1, is a perspective view of our improved implement. Fig. 2, is a sectional view of its pivotal point.

A designates the respective jaws of the nut cracker which may be of any preferred form or construction and connecting these jaws at their end is the pivot B. This pivot is rigidly secured to one of the jaws, while the other jaw turns thereon. The end of the pivot is extended and turned upward as shown, where it is sharpened to form a picking prong. A groove *a* formed in one of the jaws receives this projecting prong which is therein secured and thus prevented from turning. We do not wish, however, to be limited to this specific manner of fastening the prong as the same may be brazed to the flat surface of the jaw or the latter may be raised around the prong without departing from the spirit of our invention.

Our improved device embodies both a cracker and picker and thus constitutes an implement of great convenience.

Having thus described our invention, what we claim as new, and desire to secure by Letters Patent, is—

1. An improved implement comprising a nut cracker which consists of two jaws, a pivot for connecting them, and a picking prong formed by projecting the said pivot, substantially as shown and described.

2. An improved implement comprising a nut cracker which consists of two jaws, a pivot for connecting them, a picker prong formed by extending the said pivot, which prong is turned outward and secured to one of the said jaws so as to be rigid therewith, for the purpose substantially as shown and described.

3. A combined nut pick and cracker comprising two handles having pivotal openings, and a rivet therefor passing through the said pivotal opening and having one end extending forward and sharpened, the handle adjacent the forwardly extending portion of the rivet having projections or a recess to prevent it turning, substantially as set forth.

In testimony whereof we affix our signatures in presence of two witnesses.

NELSON R. STREETER.
    CHARLES P. MOSHER.

Witnesses:
 DEXTER H. MARSH,
 M. C. MARSH.